(12) United States Patent
Gupta

(10) Patent No.: US 6,351,810 B2
(45) Date of Patent: *Feb. 26, 2002

(54) SELF-CONTAINED AND SECURED ACCESS TO REMOTE SERVERS

(75) Inventor: Vipul Gupta, Fremont, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,493

(22) Filed: Jun. 30, 1999

(51) Int. Cl.$^7$ .............................................. G06F 9/445
(52) U.S. Cl. ............................... 713/2; 713/1; 713/200
(58) Field of Search ............................... 713/1, 2, 200, 713/201

(56) References Cited

U.S. PATENT DOCUMENTS

| | | | |
|---|---|---|---|
| 5,469,573 A | | 11/1995 | McGill, III et al. |
| 5,533,124 A | * | 7/1996 | Smith et al. ..................... 380/4 |
| 5,590,197 A | | 12/1996 | Chen et al. |
| 5,892,456 A | * | 4/1999 | Ishida ..................... 340/825.44 |
| 5,892,904 A | * | 4/1999 | Atkinson et al. ........... 713/201 |
| 6,009,518 A | * | 12/1999 | Shiakallis ...................... 713/1 |

OTHER PUBLICATIONS

Small Linux FAQ [online], [retrieved on Feb. 20, 2001]. Retrieved from the Internet: <URL: http://smalllinux-.sourceforge.net/smallfaq.html>.

Small Linux Install Guide [online], [retrieved on Feb. 20, 2001]. Retrieved from the Internet: <URL: http://smalllinux-.sourceforge.net/smallin.htm>.

PLIP and Small Linux [online], [retrieved on Feb. 20, 2001]. Retrieved from the Internet: <URL: http://smalllinux-.sourceforge.net/plip01.html>.

Slip on Small Linux [online], [retrieved on Feb. 20, 2001]. Retrieved from the Internet: <URL: http:smalllinux.source-forge. net/slip01.html>.

To install Small Linux [online], [retrieved on Feb. 20, 2001]. Retrieved from the Internet: <URL: http://smalllinux-.sourceforge.net/SmallInstall.html>.

The Unofficial Cookie FAQ [online], [retrieved on Apr. 13, 2000]. Retrieved from the Internet: <URL: http://www-.cookiecentral.com/faq/index.shtml>.

Netscape Cookies [online], [retrieved on Feb. 20, 2001]. Retrieved from the Internet: <URL: http://www.cookiecentral.com/cookie3.htm>.

\* cited by examiner

Primary Examiner—Ly V. Hua
(74) Attorney, Agent, or Firm—The Hecker Law Group

(57) ABSTRACT

A method and apparatus for remote access to a network server, using a secured and self-contained environment is described. In one or more embodiments of the invention, the needed software for transmission of information is readily available on portable media. The portable media can be used in conjunction with any compatible computer system to securely transfer or access information to or from Internet resources. In one or more embodiments of the invention, the operating system needed for accessing the remote server is stored on bootable media, such as a floppy disk for example. A user can reboot a computer or public terminal using the bootable media. Other portable and easily accessible media with larger memory storage capacity, such as a memory flash card, are utilized to store the necessary software for information communication. This invention as described is invulnerable to attacks by a preceding user of the computer system, as all communication software is freshly loaded from trusted portable media, belonging to the user. Thus, so long as the software stored on the portable storage media remains intact, all sensitive data will remain uncorrupted and immune against attacks by perpetrators.

19 Claims, 4 Drawing Sheets

SELF-CONTAINED AND SECURED ACCESS TO REMOTE SERVERS

BACKGROUND OF THE INVENTION

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, SPARC, "Write Once, Run Anywhere", Java, JavaOS, JavaStation and all Java-based trademarks and logos are trademarks or registered trademarks of Sun Microsystems, Inc. in the United States and other countries.

A. FIELD OF INVENTION

This invention relates to the field of computer systems, and more specifically, to a method and apparatus for remote access to a server, using a secured and self-contained environment.

With the advancement of the Internet technology, it is now common to access various electronic accounts or data banks from almost any location in the world, where a telephone line and a computer equipped with the appropriated connectivity software are available. Unfortunately, along with technological advancements there are also technological pitfalls that can create opportunities for security breaches in seemingly secure systems.

For example, certain airports and other facilities are equipped with public computer terminals that allow an individual to access the Internet, also known as the world wide web (WWW). Typically, all that is required to access the Internet via one of these terminals or any other computer system is an established Internet account and the required access information (i.e., account number, password, etc.). A persisting problem with such terminals is that they are susceptible to attack by information technology intruders (hackers). A computer program called a "browser" is typically installed on a terminal to provide access to various Internet sites. By manipulating certain default values in the browser's configuration, a hacker can acquire access to highly sensitive information entered by a victim user. Once the information is obtained a hacker can further use that information for illegitimate purposes.

Currently, there are no effective methods available to eliminate the danger of such intrusive activities. A method and/or apparatus is needed that can provide a secure environment for Internet access, especially in circumstances where covert manipulation or capture of electronic data is an undesirable possibility. The security issues associated with accessing remote computer networks can be better understood from a discussion of general networking principals and the Internet environment, set forth below.

B. BACKGROUND ART

Networks

In modem computing environments, multiple computers or workstations are linked together in a network to communicate between, and share data with, network users. A network also may include resources, such as printers, modems, file servers, etc., and may also include services, such as electronic mail, information transfer services, etc.

A network can be a small system that is physically connected by cables or via wireless communication (a local area network or "LAN"), or several separate networks can be connected together to form a larger network (a wide area network or "WAN"). Other types of networks include the Internet, tel-com networks, intranets, extranets, wireless networks, and other networks over which electronic, digital, and/or analog data may be communicated. An Intranet is an internal corporate or organizational network that uses many of the same communication protocols as the Internet. The terms Internet, World Wide Web (WWW), and Web as used herein include the Intranet as well as the Internet.

Internet

The Internet is a client/server system. A "client" is the computer that one uses to access the Internet. When a user logs onto the Internet using a client computer, the user may view "web pages" that are stored on a remote "server" computer. Information including data, files, and the web pages to be viewed are often transferred between the client and the server. One method for transferring the data may be more secure than another method depending on the operating software. This in part is related to the configuration of hardware and software components that form the operating environment for data communication. Some background on the various Internet components helps provide an understanding of these problems.

Browsing Software

The components of the WWW include browsing software, network links, and servers. The browsing software, or browser, is a user-friendly interface that simplifies access to the Internet. A browser allows a client to communicate a request without having to learn a complicated command syntax, for example. A browser typically provides a graphical user interface (GUI) for displaying information and receiving input. For example, a browser displays information to a client or user as pages or documents.

A language called Hypertext Markup Language (HTML) is used to define the format for a page to be displayed in the browser. A Web page is transmitted to a client as an HTML document. The browser executing at the client parses the document and produces and displays a Web Page based on the information in the HTML document. Consequently, the HTML document defines the Web Page that is rendered at runtime on the browser. Examples of browsers currently available include Netscape Navigator and Internet Explorer.

Network Communication/Data Transfer

A server may act as a repository of information on the WWW and is capable of processing a client request for the information. To enable the computers on a network including the WWW to communicate with each other, a set of standardized rules for exchanging the information between the computers, referred to as a "protocol", is utilized. Transfer protocols generally specify the data format, timing, sequencing, and error checking of data transmissions. Numerous transfer protocols are used in the networking environment. For example, one example of a transfer protocol is the transmission control protocol/Internet protocol ("TCP/IP"). The TCP/IP transfer protocol is used on the Internet and on many multiplatform networks.

TCP/IP is sometimes used to refer to a suite of protocols that includes TCP/IP as well as other protocols such as the file transfer protocol ("FTP"), hypertext transfer protocol ("HTTP"), simple mail transport protocol ("SMPT") and network terminal protocol ("TELNET")).

The TCP transfer protocol is often utilized to transmit large amounts of information. The TCP protocol is responsible for breaking up a message to be transmitted into datagrams of manageable size, reassembling the datagrams at the receiving end, resending any datagrams that get lost (or are not transferred), and reordering the data (from the datagrams) in the appropriate order. A datagram is a unit of data or information (also referred to as a packet) that is transferred or passed across the Internet. A datagram contains a source and destination address along with the data.

The TCP/IP protocol interfaces with the lower-layer network infrastructure. Protocols such as HTTP, FTP, etc., provide an interface to the application layer and are referred to as application protocols. An application protocol defines a set of rules for communication between network applications. Hyper Text Transfer Protocol (HTTP) is an application protocol that is used for communication between an information server and a client browser on the WWW. HTTP has communication methods that identify operations to be performed by a network application (e.g. commands that allow clients to request data from a server and send information to the server).

Secured Data Transmission

A transfer protocol may also include security measures that ensure the uninterrupted and secure transfer of data from one network port to another by implementing encryption/decryption mechanisms on the sending and the receiving ends. For example, HTTPS is a secured information transfer protocol having a Secure Socket Layer (SSL) implementation for the HTTP protocol. SSL is a protocol developed by Netscape for a software layer that sits between the application software and the TCP/IP stack. Using the SSL layer information prior to transmission is encrypted by the client. The SSL is implemented to provide data encryption, message integrity, and user authentication in server client communications.

Unfortunately, even using the above mechanisms, security risks may not be eliminated all together. For example, while it may be difficult for an intruder to decrypt encrypted data, he may be able to divert the data transmission destination altogether. Thus, unbeknownst to the user, the user may be securely interacting with an impostor server. An intruder, in this manner, can reroute certain sensitive information such as account numbers, passwords, or other highly confidential information to an impostor server system that imitates the look and feel of the intended server. A user alluded into thinking that his/her transactions are being securely processed by a legitimate source will readily provide any information requested by the impostor.

For example, some current Internet browsers prior to sending information to a requesting server verify whether that server is a trusted server. A server is a trusted server when the authenticity of a token (also called a certificate) sent from that sever is verified by the receiving client. Regretfully, once a certificate is verified by a first user, the server that has sent the certificate will remain on the list of trusted servers to that client until it is deleted. As this list is typically invisible to a common user, a back door can be established by a perpetrator to divert information entered by a subsequent user to a destination that has not been verified by that user.

FIG. 1 illustrates a block diagram of a public terminal or computer in communication with remote servers. Public terminal 110 includes browser 113 and operating system (OS) 115 that can be used to establish a connection with a server over the Internet. The system of FIG. 1 can be manipulated by a hacker, so that information that are supposed to be routed to legitimate server 120 are redirected to an impostor server 130 (e.g., by modifying the proxy settings on browser 113). A hacker can manipulate browser 113 to accept an unauthorized certificate issued by impostor server 130 as a trusted certificate for legitimate server 120.

A subsequent user may later use public terminal 110 to access legitimate server 120. Unbeknown to the user, if the proxy setting have been previously manipulated by a hacker, the connection may be redirected to impostor server 130 instead of legitimate server 120. If the browser settings have been manipulated so that impostor server 130 has been already added to the list of trusted servers by the hacker, it will successfully authenticate against public terminal 110 as if the user is establishing a connection with legitimate server 120. Thereafter, any information transmitted by the user will be intercepted by impostor server 130 over a secure connection terminating at that server. Once the needed information are obtained the connection can be disconnected by impostor server 130 by relaying some typical error message or response to its victimized user.

As such, despite of security measures, a computer system that is subject to tampering by many users is vulnerable and unsafe for secured data transmission. Thus, a method and apparatus is needed that allows a user to securely utilize a public computer terminal or any other computer for Internet access.

SUMMARY OF THE INVENTION

A method and apparatus for remote access to a network server, using a secured and self-contained environment is described. In one or more embodiments of the invention, the needed software for transmission of information is readily available on bootable, portable media. The portable media can be used in conjunction with any compatible computer system to securely transfer or access information to or from Internet resources.

In one or more embodiments of the invention, the operating system needed for accessing the remote server is stored on bootable media, such as a floppy disk for example. A user can reboot a computer or public terminal using the bootable media. Other portable and easily accessible media with larger memory storage capacity, such as a memory flash card, are utilized to store software applications necessary for information communication, such as browsers, email clients, etc.

One or more embodiments of the invention are invulnerable to attacks by a preceding user of the computer system, as the required operating systems and communication software are loaded from trusted portable media, carried by the user. Thus, so long as the software stored on the portable storage media remains intact, the self-contained environment created from the execution of that software will remain uncorrupted and immune against attacks by perpetrators.

DETAILED DESCRIPTION OF THE INVENTION

The invention provides a method and apparatus for remote access to an Internet server, using a secured and self-contained environment. In the following description, numerous specific details are set forth in order to provide a more thorough understanding of the present invention. It will be apparent, however, to one skilled in the art, that the present invention may be practiced without these specific details. For example, this invention in one or more embodiments is described as applicable to web browsing. However, this is by way of example only. It is understood that this invention is equally applicable to other forms of network access (e.g., telnet, email, etc.). In some instances, well-known features of the invention have not been described in detail in order not to unnecessarily obscure the present invention.

Embodiment of Computer Execution Environment (Hardware)

Figure 1:
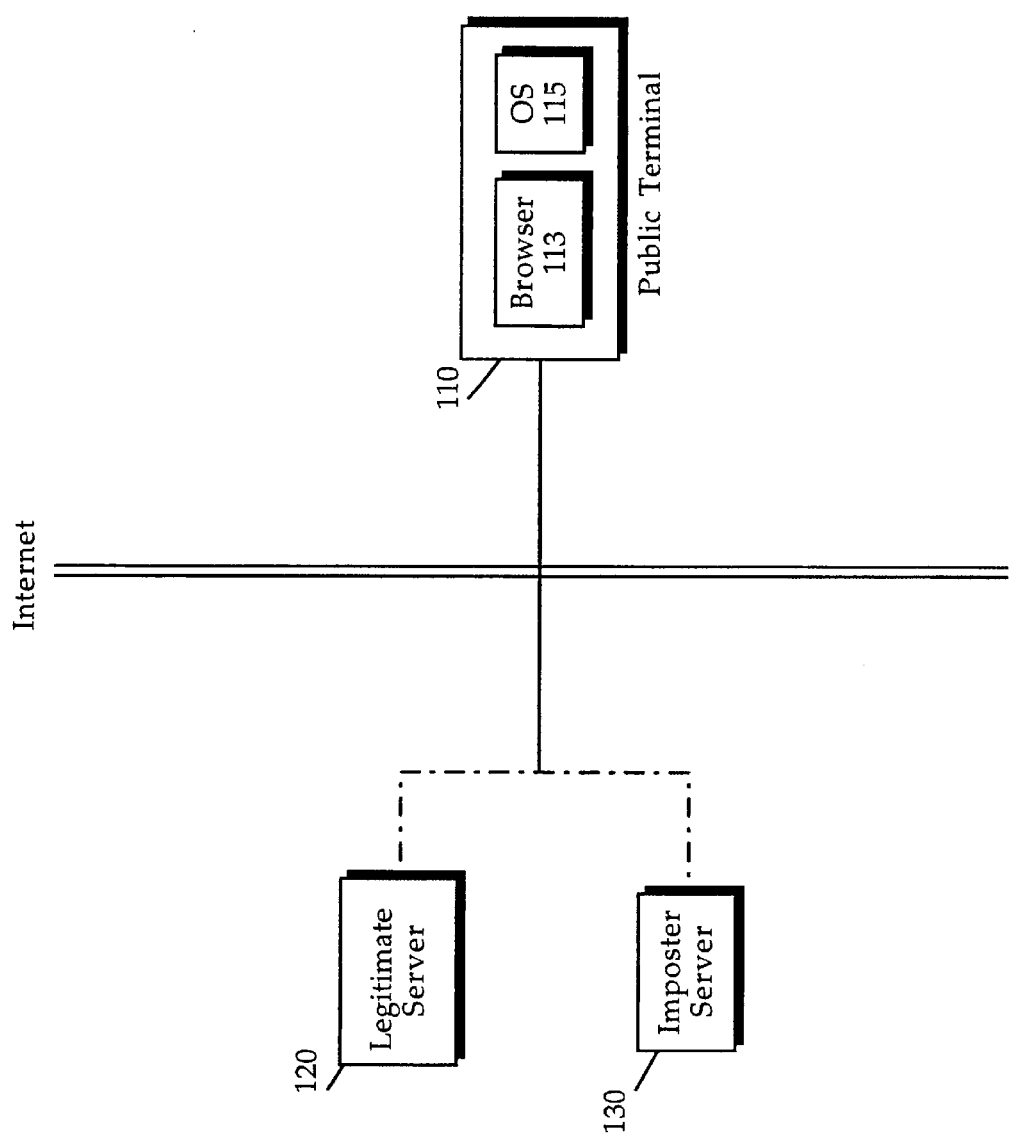
FIG. 1 illustrates a block diagram of a public terminal or computer in communication with a remote server.
Figure 2:
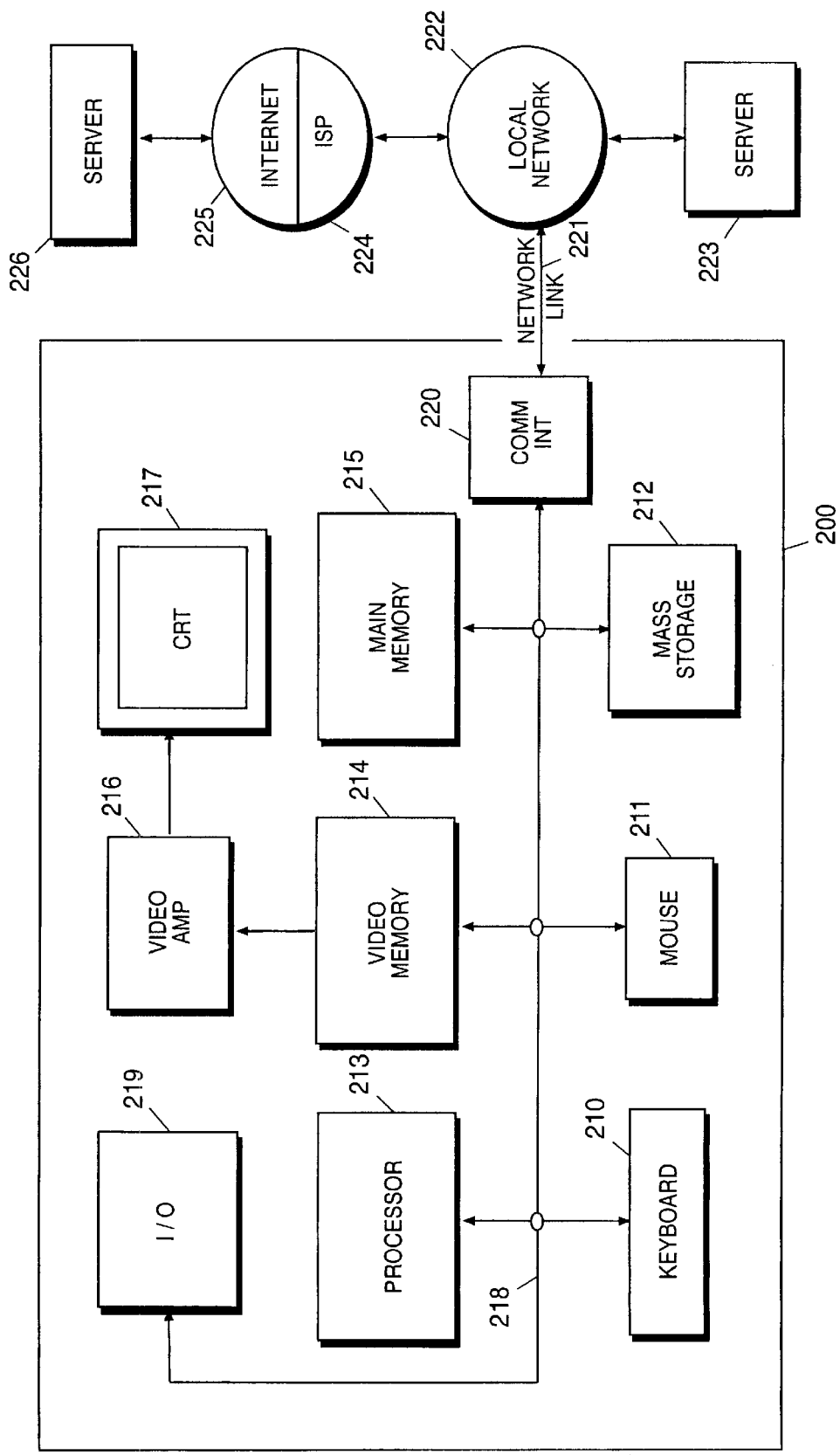
FIG. 2 is an illustration of a general purpose computer, according to one or more embodiments of the invention.

An embodiment of the invention can be implemented as computer software in the form of computer readable code executed on a general purpose computer such as computer 200 illustrated in FIG. 2, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 210 and mouse 211 are coupled to a system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to system bus 218 represents such I/O elements as a printer, A/V (audio/video) I/O, etc.

Computer 200 includes a video memory 214, main memory 215 and mass storage 212, all coupled to system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 64-bit data bus for transferring data between and among the components, such as processor 213, main memory 215, video memory 214 and mass storage 212. Alternatively, multiplex data/address lines may be used instead of separate data and address lines.

In one embodiment of the invention, the processor 213 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to local server computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, remote server computer 226 might transmit a requested code for an application program through Internet 225, ISP 224, local network 222 and communication interface 220.

The received code may be executed by processor 213 as it is received, and/or stored in mass storage 212, or other non-volatile storage for later execution. In this manner, computer 200 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Mode of Operation

Computer systems are susceptible to attack by various sources, such as viruses and Trojan horses. Viruses are deliberately designed malignant software that damage or corrupt the file system or the security system of a computer. A Trojan horse type application, on the other hand, resides within a computer system and in one way or the other covertly takes over the management and the processing of data transmitted in and out of the system. A public computer terminal is specially susceptible to the above attacks, as various users may have the opportunity to either intentionally or unintentionally install or transmit a virus or a Trojan horse onto the system.

To alleviate the above concerns, a public computer terminal or any other computer can be safely operated using one or more embodiments of the invention. Embodiments of the invention include an operating system and connectivity software for connecting to the Internet. The operating system and the connectivity software are each independently stored in portable media so that they can provide a self-contained operating environment for that system once they are executed on it.

Figure 3:
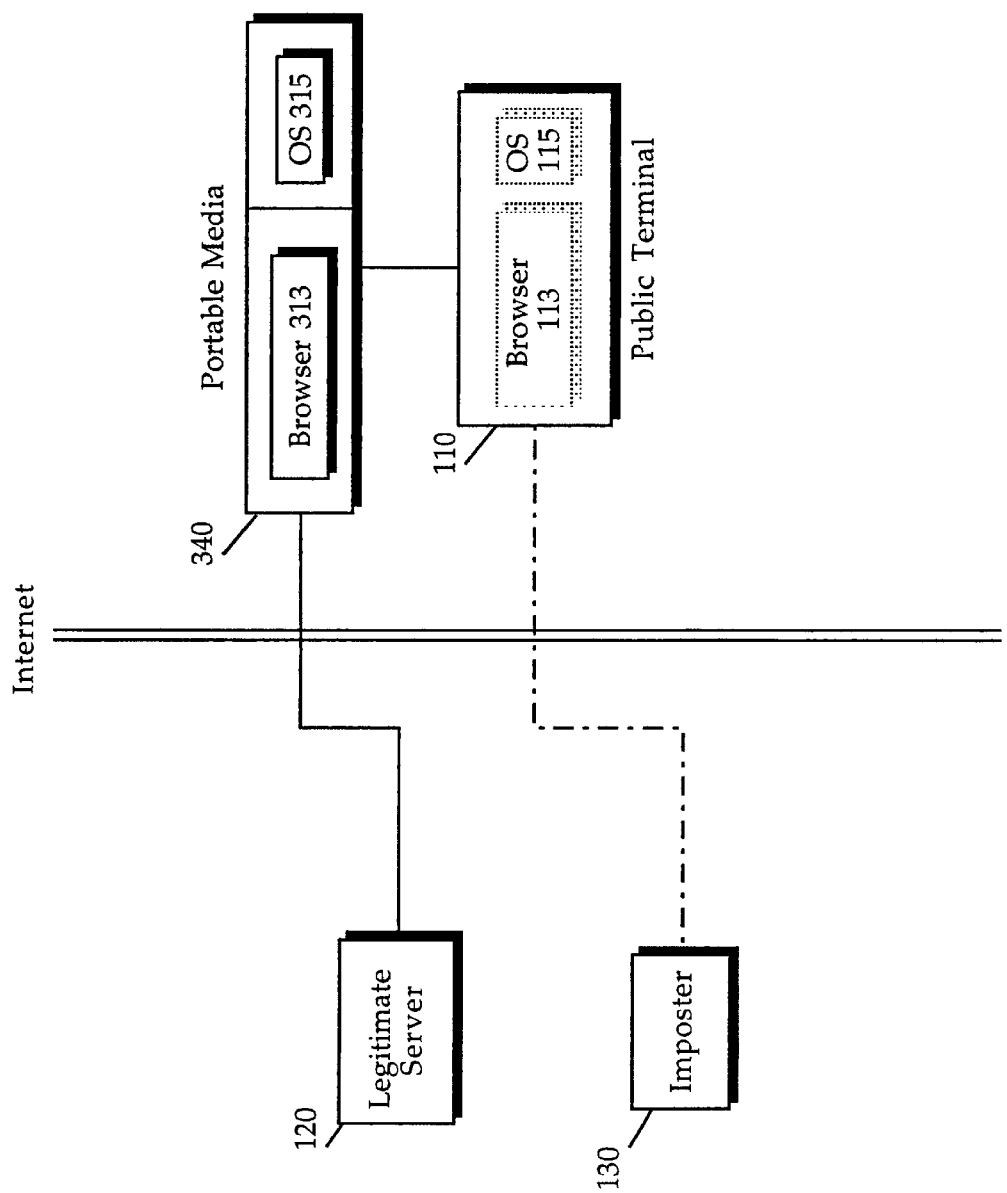
FIG. 3 illustrates a block diagram of a public terminal or computer in communication with a remote server, according to one or more embodiments of the invention.

FIG. 3 illustrates a block diagram of a computer or a public terminal 110 communicating via the Internet with a remote server, according to one or more embodiments of the invention. Public terminal 110 includes browser 113 and operating system 115. Browser 113 and operating system 115 provide the computer environment needed for accessing a remote server via the Internet and retrieving information from it. However, they are susceptible to attack by an intruder and can be manipulated, as described earlier. Therefore, to avoid the risks associated with using a corrupt environment (i.e., the risk of interception of sensitive data), in one or more embodiment of the invention, all needed software for the formation of a safe and secured environment is implemented in form of a self-contained software package and is stored onto portable media that can be easily carried by a user.

In one or more embodiments of the invention, the operating system needed for remote access to a legitimate server 120 is stored on bootable, portable media 340, for example a floppy disk. Similarly, other portable and easily accessible media with larger memory storage capacity, such as memory flash cards, are utilized to store connectivity and communication software (i.e., browser 313) that cannot be suitably stored onto a floppy disk, for example.

Figure 4:
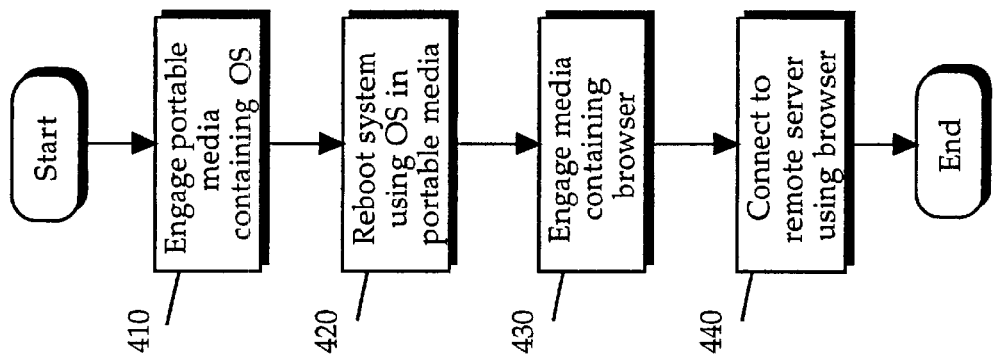
FIG. 4 is a flow diagram illustrating the method of accessing a remote server, using a secured and self-contained operating environment, according to one or more embodiments of the invention.

FIG. 4 is a flow diagram illustrating the method of accessing a remote server, using a secured and self-contained operating environment, according to one or more embodiments of the invention. At step 410, a user engages portable media 340 containing operating system 315 with public terminal 110. This can be done, for example, by inserting a single bootable floppy disk that contains a self-contained Linux operating system.

At step 420 public terminal 110 is rebooted using operating system 315 stored in portable media 340. Operating system 315 is preferably compact so that it can fit on a single storage media, such as a floppy disk. In one or more embodiments of the invention, portable media 340 contains a trimmed version of the Linux kernel (i.e., program software that form the core of the Linux operating system) and additional system files or drivers necessary to recognize and manage other system accessories, such as memory flash cards.

In other embodiments of the invention, operating system 315 also contains the needed system files to operate public terminal 110, and the required program code for the system to properly execute any communication or connectivity software stored on portable media 340. In one or more embodiments of the invention connectivity software, such as browser 313, are stored on a second self-contained storage media, for example a flash card. A flash card can store relatively larger amounts of data as compared to a floppy disk. However, many computers are not capable of booting from a flash card. Therefore, a flash card can't be utilized for the storage of operating system software.

At step 430, the user engages portable media containing communication and connectivity software, such as browser 313, with public terminal 110. The communication and connectivity software provide the means for establishing a connection with a server through Internet lines, and enable a user to access, retrieve or transmit information to and from servers available on the Internet. At step 440, public terminal 110 utilizes browser 313 or other suitable communication or connectivity software to connect to a desirable remote server (e.g. legitimate server 120) via the Internet. Once the connection is established the user can, for example, securely retrieve his or her email messages, access various web sites on the Internet, or otherwise communicate with available resources.

This invention as described is invulnerable to attacks by a preceding user of public terminal 110, as all communication software is loaded from trusted portable media, belonging to the current user. For example, in a preferred mode of operation, browser 313 and operating system 315 stored on self-contained and portable media 340 over take the operating environment needed for accessing a remote server (e.g., legitimate server 120). In this mode, browser 113 and operating system 115 no longer provide any functionality or operating environment for public terminal 110. Therefore, any covert modifications or manipulation previously made to either will not effect the data that is retrieved by and/or transmitted through public terminal 110.

Due to the fact that browser 313 is an untampered and self-contained application and that it only includes a list of trusted servers for the current user, impostor server 130 will be unable to successfully authenticate against public terminal 110, because it will not be recognized as a trusted server by browser 313. Thus, all data communications initiated from public terminal 110 remains secure and within the appropriate confines as allowed and monitored by self-contained software stored in portable media 340.

The portable storage media, such as floppy disks and flash cards, described above are provided by way of example, it being understood that the present invention has broad application to other types of storage media or storage devices. Likewise the connectivity and operating software used in conjunction with the invention can by of any type, and are not limited to browsers or other software described above for the purpose of example.

What is claimed is:

1. A method of accessing a remote server, using a secured and self-contained environment comprising:
    resetting a computing system using a secured and self-contained operating system stored in portable bootable media;
    accessing said remote server using secured and self-contained system software stored in portable media in operational relationship with said computing system.

2. The method of claim 1, wherein said operating system is stored in a first medium, and said system software is stored in a second medium.

3. The method of claim 2, wherein said first medium is a bootable floppy disk.

4. The method of claim 2, wherein said second medium is a PCMCIA flash card.

5. The method of claim 2, wherein said operating system is a Linux operating system.

6. The method of claim 2, wherein said system software is an Internet browser application.

7. A computer program product comprising:
    a computer usable medium having computer readable program code embodied therein configured to access a remote server, using a secured and self-contained environment comprising:
    computer readable code configured to cause a computer to reboot using a secured and self-contained operating system stored in portable bootable media, wherein said operating system comprises system files and drivers necessary to recognize and manage said computer and system accessories, operate a public terminal and execute communication and connectivity software;
    computer readable code configured to cause a computer to access said remote server using secured and self-contained system software stored in portable media in operational relationship with said computing system, wherein said system software comprises a browser, communications and connectivity software.

8. The computer program product of claim 7, wherein said operating system is stored in a first medium, and said system software is stored in a second medium.

9. The computer program product of claim 8, wherein said first medium is a bootable floppy disk.

10. The computer program product of claim 8, wherein said second medium is a PCMCIA flash card.

11. The computer program product of claim 8, wherein aid operating system is a Linux operating system.

12. The computer program product of claim 8, wherein said system software is an Internet browser application.

13. A system comprising:

a processor;

a memory;

one or more portable media;

code executed by said processor configured to access a remote server, using a secured and self-contained environment; said code comprising:

a method of rebooting said system by a current user using a secured and self-contained operating system stored in one of said portable media, wherein said operating system comprises system files and drivers necessary to recognize and manage said computer and system accessories, operate a public terminal and execute communication and connectivity software;

a method accessing and authenticating said remote server using secured and self-contained system software stored in one of said portable media, wherein said system software comprises a browser, communications and connectivity software and a list of trusted servers for said current user, wherein said remote server provides access to electronic mail, web sites on the Internet and communication with other resources.

14. The system of claim 13, wherein said operating system is stored in a first medium, and said system software is stored in a second medium.

15. The system of claim 14, wherein said first medium is a bootable floppy disk.

16. The system of claim 14, wherein said second medium is a PCMCIA flash card.

17. The system of claim 14, wherein said operating system is a Linux operating system.

18. The system of claim 14, wherein said system software is an Internet browser application.

19. A method of accessing a trusted remote server, using a secured and self-contained environment, comprising:

rebooting a system by a current user using a secured and self-contained operating system stored in portable media, wherein said operating system comprises system files and drivers necessary to recognize and manage computer and system accessories, operate a public terminal and execute communication and connectivity software; and accessing a remote server using secured and self-contained system software stored in said portable media, wherein said system software comprises a browser, communications and connectivity software.

* * * * *